Feb. 4, 1930.  A. F. PHILLIPS  1,745,448
WINDSHIELD HEATING DEVICE
Filed Aug. 15, 1928
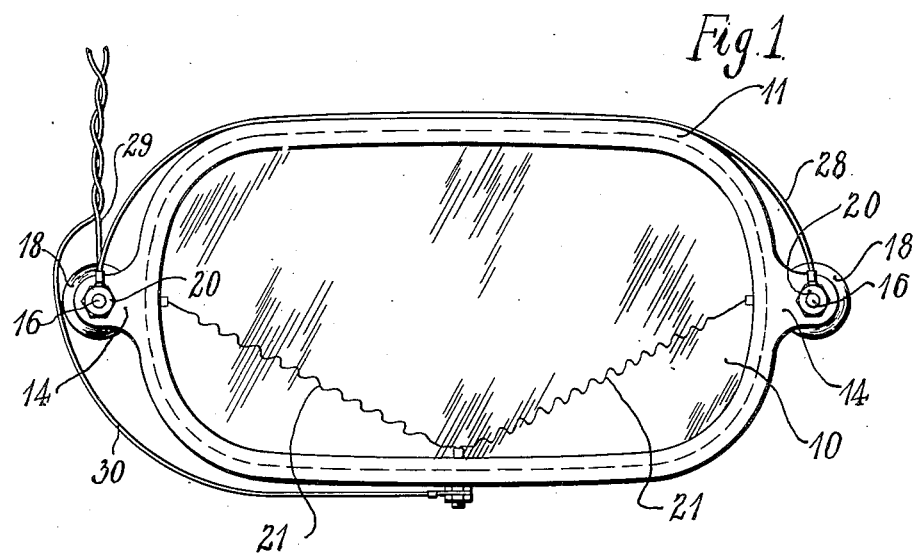
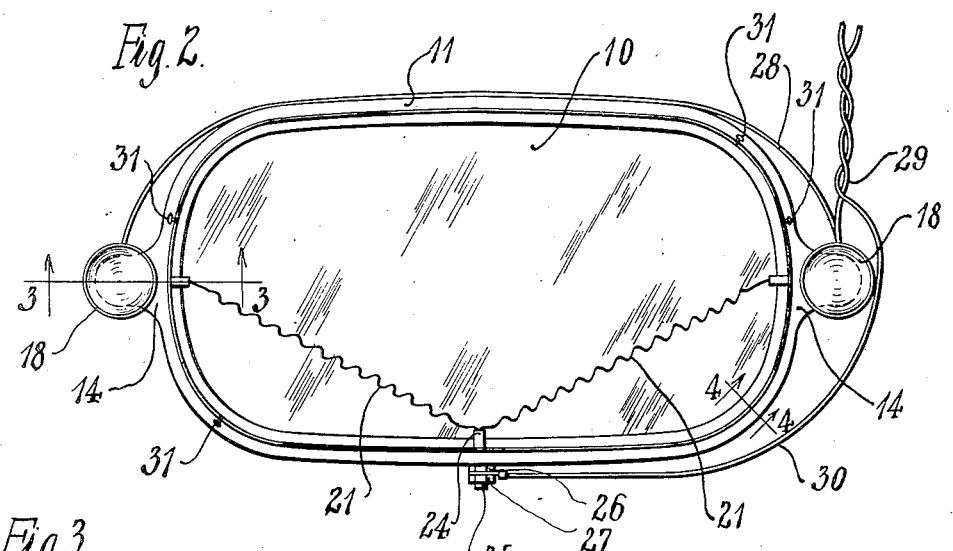
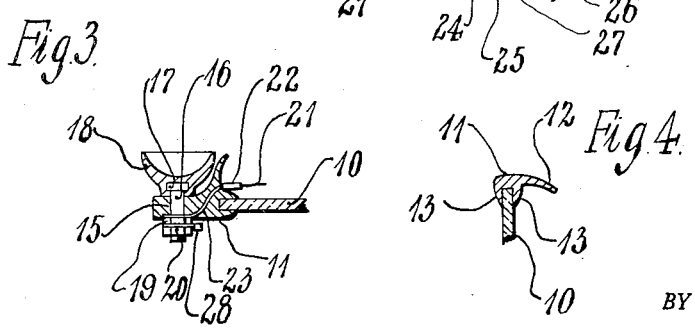
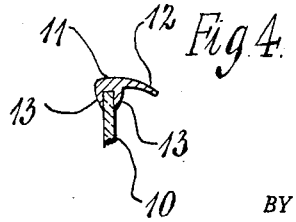
INVENTOR.
Arthur F. Phillips
BY Chapin & Neal
ATTORNEYS.

Patented Feb. 4, 1930

1,745,448

UNITED STATES PATENT OFFICE

ARTHUR F. PHILLIPS, OF HOLYOKE, MASSACHUSETTS, ASSIGNOR, BY MESNE ASSIGNMENTS, TO RELIANCE SPECIALTY CO., INC., OF HOLYOKE, MASSACHUSETTS, A CORPORATION OF MASSACHUSETTS

WINDSHIELD-HEATING DEVICE

Application filed August 15, 1928. Serial No. 299,762.

My invention relates to detachable means for heating the wind shields of automobiles and the like to prevent the formation of ice thereon. One object of the invention is to provide a device of this character which will be readily attachable and detachable. A further object is to provide a device of this character having a simple construction. A further object is to provide a device of this character which will be cushioned to prevent breakage and which can be readily taken apart for the replacement of damaged portions.

Referring to the drawings:

Fig. 1 is a front view of a device constructed in accordance with my invention;

Fig. 2 is a rear view thereof;

Fig. 3 is a section on the line 3—3 of Fig. 2; and

Fig. 4 is a section on the line 4—4 of Fig. 2

In accordance with my invention, I provide a glass pane 10, preferably of plate glass in order to insure good visibility and to have a thickness of glass sufficient to avoid cracking under heat. This glass pane is held spaced from the windshield of an automobile by an endless frame 11 of rubber or other flexible and elastic material, preferably molded in one piece. The frame has a windshield engaging lip 12 and a channeled portion 13 adapted to embrace the edges of the glass pane, as clearly shown in Fig. 4. At the ends of the frame are extensions 14, each having a hole 15 through it. Through each of these holes passes a stud 16 having at its end an enlargement 17 molded into the base of a suction cup 18. Each stud is clamped to an extension 14 by a nut 19 and a lock nut 20.

A pair of resistance wires 21 are soldered as at 22 to strips 23 which pass through the rubber of each extension 15 and are clamped by the nut 19. The other end of each strip is soldered as at 24 to a stud or connector 25 passing through the wall of the frame at an intermediate point and held by a nut 26 and a lock nut 27. A wire 28 joins the two studs 16, being clamped between the nuts 19 and 20 of each, and wires 29 and 30 join the wire 28 and the stud 25 respectively to opposite poles of a suitable current supply such as a storage battery.

In use, the suction cups are moistened and pressed firmly against the windshield directly in front of the driver, and wires 29 and 30 are connected to the current supply. Due to the engagement of the flexible lip 12 with the glass of the windshield, a compartment is provided between the glass pane 10 and the windshield, heated by the resistance wire 21. The heat communicated thereby to the windshield prevents the formation of sleet or ice upon it and insures clear visibility. It is preferable to provide holes 31 through the lip 12 at spaced points, preferably oppositely arranged, so that a slight circulation of air is maintained through the space between the windshield and the pane. This prevents cracking of the glass due to the heat within the space becoming excessive. When the need for the device has passed, it can readily be removed from the windshield by stripping the suction cups from the glass and disconnecting the current source.

A device constructed as described is very simple in construction and inexpensive to manufacture. The elastic rubber frame possesses the desirable combination of cushioning the glass pane and of being wholly unitary and of the utmost simplicity. It can be applied to and removed from the glass pane by simply rolling the channel section out of engagement with the edge of the glass, thereby making the device readily repairable in case of breakage. By the avoidance of metal frames and complicated attachments, the device is made at once cheaper and more efficient, since the frame is in one piece and serves as its own cushion.

What I claim is:

1. A windshield warming device comprising an endless frame of rubber-like material channeled to receive a glass pane and provided with a windshield engaging lip and with end extensions, a glass pane mounted in the channel of the frame, studs passing through the end extension of the frame, suction cups secured to the studs, electrical heating devices secured to the studs, means for supplying current to the heating devices, and apertures through the frame permitting circulation of air.

2. A windshield warming device comprising an endless frame of rubber-like material channeled to receive a glass pane and provided with a windshield engaging lip and with end extensions, a glass pane mounted in the channel of the frame, studs passing through the end extensions of the frame, suction cups secured to the studs, electrical heating devices secured to the studs, and means for supplying current to the heating devices.

3. A windshield warming device comprising an endless frame of rubber-like material channeled to receive a glass pane and provided with a windshield engaging lip and with end extensions, a glass pane mounted in the channel of the frame, studs passing through the end extensions of the frame, suction cups secured to the studs, electrical connecting members passing from the studs to the inside of the frame, a third electrical connecting member passing through the frame intermediate its ends, resistance wires joining said third connecting member with each of the other connecting members, a wire joining the two end connecting members, and wires joining the end members and the third member respectively to the opposite poles of a current supply.

4. A windshield warming device comprising a frame, a glass pane fitted to the frame and retained thereby, means for holding the frame closely against a windshield with the glass pane spaced slightly therefrom, and an electric heating coil arranged in the form of a broad V in the space between the glass pane and the windshield.

5. A windshield warming device comprising an elongated frame, a glass pane fitted to the frame and retained thereby, means for holding the frame closely against a windshield with the glass pane spaced slightly therefrom, and an electric heating coil arranged in the form of a broad V in the space between the glass pane and the windshield, the ends of the V terminating at substantially the centers of the end portions of the frame and the apex of the V terminating at substantially the center of the bottom of the frame.

In testimony whereof I have affixed my signature.

ARTHUR F. PHILLIPS.